Jan. 31, 1956 F. H. STAMPER 2,733,118

MAGNETICALLY STABILIZED SCANNING RECORDER

Filed May 25, 1953

INVENTOR.
F. H. Stamper

BY

ATTORNEY

United States Patent Office 2,733,118

Patented Jan. 31, 1956

2,733,118

MAGNETICALLY STABILIZED SCANNING RECORDER

Furman H. Stamper, Los Angeles, Calif., assignor to Bendix Aviation Corporation, North Hollywood, Calif., a corporation of Delaware Application May 25, 1953, Serial No. 357,295

6 Claims. (Cl. 346—139)

This invention relates to scanning recorders such as are used in depth recording and the like and is particularly applicable, although not limited, to recorders of the type disclosed in U. S. Patent No. 2,614,903, issued October 21, 1952.

That patent discloses a scanning recorder employing an elongated resilient stylus extending from a rotating drum with guide means for deflecting the free end of the stylus into a linear scanning path extending across a record sheet once during each revolution of the drum. Because of the change in direction of movement of the stylus and as it enters the linear scanning path it has a tendency to bounce, which increases with speed and limits the speed at which such recorders can be operated.

An object of the invention is to increase the speed at which a scanning recorder of the type disclosed in the prior patent can be operated.

Another object is to reduce bouncing of a scanning stylus away from its guide means at high speed.

Another object is to generally stabilize movement of a scanning stylus of the type disclosed in the said prior patent.

Other more specific objects and features of the invention will appear from the description to follow.

Briefly, the present invention enables operation of the type of scanning recorder disclosed in the prior patent at higher speeds, by utilizing magnetic attraction between the stylus member and the track to cause the stylus member to follow the track without bouncing. More specifically, the invention involves the use of a ferro-magnetic stylus member and a magnetic track section so disposed that prior to entrance of the free end of the stylus member into the scanning path an intermediate section of the stylus member closely approaches the magnetic track section and is drawn thereto, whereupon the remainder of the stylus member extending toward the free end thereof is rapidly pulled against the track.

A feature of the invention is a simple structure attached to the end of the stylus member for supporting a separate wire recording tip which contacts the record sheet and produces the record thereon.

A full understanding of the invention may be had from the following detailed description with reference to the drawing, in which.

Figure 1:
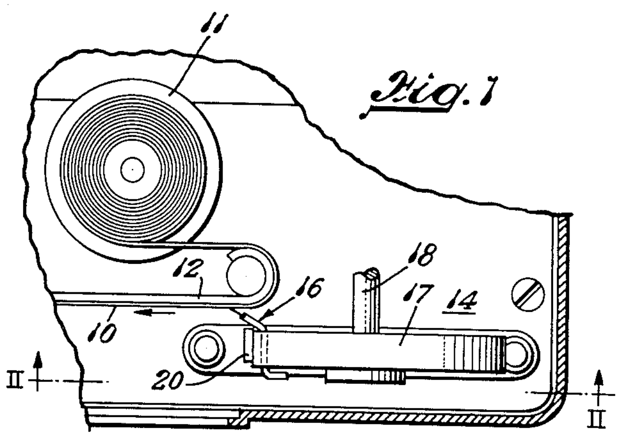
Fig. 1 is a plan view of a portion of a scanning recorder incorporating a stylus mechanism in accordance with the invention.
Figure 3:
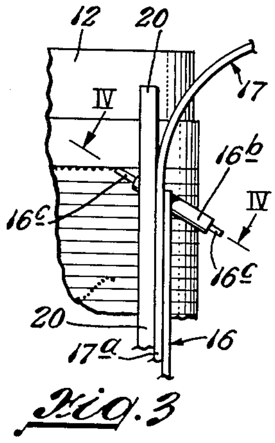
Fig. 3 is an enlarged elevational view of a portion of the apparatus shown in Fig. 2.
Figure 5:
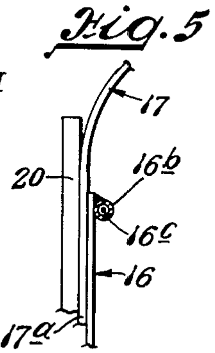
Fig. 5 is a detail section taken in the plane V—V of Fig. 4.
Figure 2:
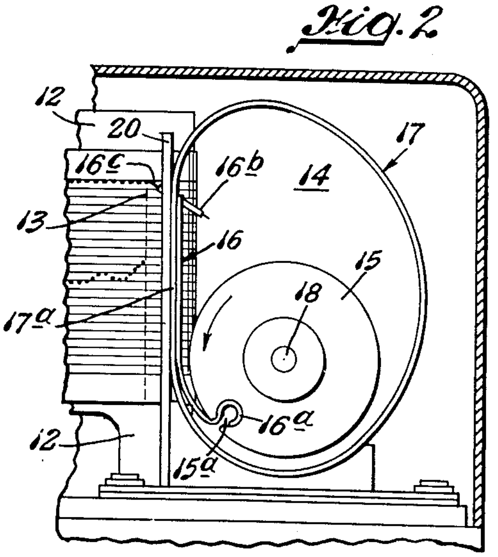
Fig. 2 is a front elevational view of the stylus mechanism shown in Fig. 1.

Figs. 1 and 2 show as much of a scanning recorder of the type of the prior Patent No. 2,614,903 as is necessary to understand the present invention, and reference to the patent is made for details of the complete recorder not described herein. The present invention differs from the patent only in the mechanical construction and arrangement of the stylus and stylus guiding structure. Hence it is not necessary to discuss herein the electrical circuits, record sheet pulling mechanism, etc.

Referring to Figs. 1 and 2, there is shown a sheet record 10 in the form of an elongated paper tape that is continuously drawn (by a mechanism not shown) from a roll 11 through a record path defined by a backing member 12 past a stylus path (indicated by the dotted line 13) extending transversely thereacross.

A stylus mechanism 14 is positioned adjacent the front side of the record path and comprises a stylus carrier 15 in the form of a drum, an elongated resilient stylus member 16, and a guide member 17.

The stylus carrier 15 is supported and rotated by a shaft 18 which is continuously rotated by a motor (not shown). The stylus member 16 may consist of a thin strip of steel attached at one end to the periphery of the carrier 15, as by curling that end as indicated at 16*a* and engaging it in a recess 15*a* in the rim of the carrier. The other, free, end of the member 16 constitutes the scanning end and comprises a small crooked tube 16*b* welded to the steel strip, and a stylus wire 16*c* extending through the tube and therebeyond to sweep the record sheet 10 in the scanning path 13. The wire 16*c* may be of stiff stainless steel frictionally retained in the crooked tube but capable of being forced therethrough as it wears away. The steel strip constituting the major portion of the stylus member 16 is normally straight so that when unrestrained it extends substantially tangentially from the rim of the carrier 15. It will be observed from Fig. 2 that the stylus tip 16*c* is in position in contact with the record sheet 10 at the upper edge of the recording portion thereof, in which position the major portion of the stylus member 16 lies flat against a straight portion 17*a* of the track 17, and contact of the stylus member with the track deflects it from its normal tangential position with respect to the carrier 15. As the carrier rotates from the position shown in Fig. 2, more and more of the stylus member 16 wraps around the carrier, which results in the stylus tip 16*c* being moved downwardly at a substantially constant speed while the main body of the stylus 16 wraps around the carrier 15. By the time the stylus tip 16*c* reaches the lower edge of the recording portion of the record sheet 10, substantially all of the stylus member is wrapped around the carrier 15. Thereafter, the free end portion of the stylus member moves over a lower circular section of the track 17 which is substantially concentric with respect to the carrier 15, and, during this interval, the stylus remains largely wrapped around the carrier. Thereafter the stylus moves over a section of the track 17 that diverges more and more from the axis of the carrier 15 until it reaches the position shown in full lines in Fig. 6 in which the stylus member is in its outermost position with respect to the carrier.

Figure 4:
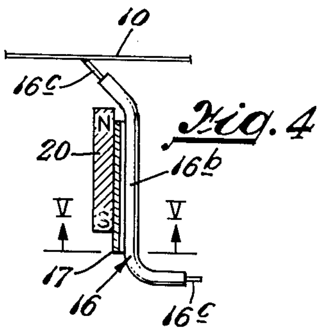
Fig. 4 is a detail section taken in the plane IV—IV of Fig. 3.

In accordance with the present invention, the stylus member 16 is made of ferro-magnetic material (steel as mentioned), and it cooperates with a magnetized ferro-magnetic member 20 associated with the track 17. Thus the member 20 consists of a bar magnet transversely magnetized as indicated in Fig. 4 and of approximately the same width as the steel strip constituting the body of the stylus member 16. The track 17, or at least the portion 17*a* thereof which lies against the bar magnet 20 is preferably of non-magnetic material, such as brass, for example.

The bar magnet 20 exerts a magnetic pull on the stylus member 16. In the position of the stylus member shown in full lines in Fig. 6 a portion of the stylus member relatively near to the carrier 15 closely approaches the straight portion 17*a* of the track 17 and is attracted by the magnet 20. The attraction aids the movement of the closest portion of the stylus member against the track 17*a*. As is well known, the magnetic attraction between two bodies increases as the distance between them is reduced. Hence the magnetic attraction of the magnet for the portion of the stylus member next adjacent the portion in contact with the track section 17*a* is relatively strong, and causes the outer end portion of the stylus member to pull in rapidly against the track section. The result is that when the carrier 15 reaches the position shown in Fig. 2 the magnet 20 has pulled the entire length of the stylus member 16 snugly up against the straight track section 17*a* and maintains it in contact therewith throughout the traverse of the stylus tip 16*c* across the record sheet.

Figure 6:
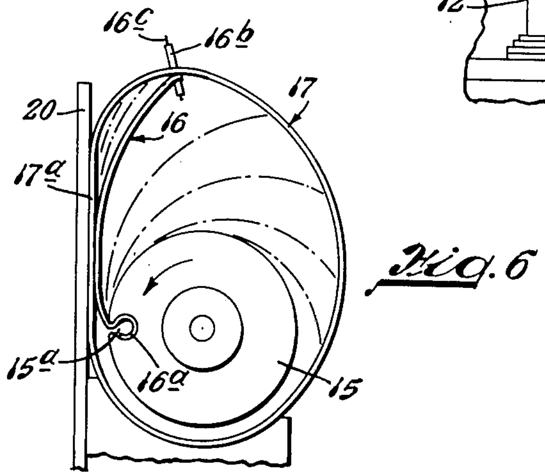
Fig. 6 is a schematic diagram illustrating the operation of the stylus mechanism.

The progressive pulling in of the stylus member from the position shown in Fig. 6 to that shown in Fig. 2 due to the magnetic pull of the magnet 20 greatly increases the speed at which the device can be operated and still have the stylus tip 16*c* move through the desired stylus path 13. Without the magnetic pull, the tip of the stylus member tends to leave the track between the positions shown in full lines in Fig. 6 and the position shown in Fig. 2 respectively, so that the tip 16*c* does not lie in the stylus path when the carrier is in the position shown in Fig. 2.

As shown in Fig. 4, the magnet 20 is preferably offset toward the record sheet 12 to provide a magnetic force urging the stylus tip 16*c* against the record sheet. This results from the fact that the magnetic pull tends to center the stylus member 16 with respect to the magnet 20.

Although it is usually desirable to use a continuous closed track 17 as indicated, this is not essential. It is found that even if the upper part of the curved portion of the track leading up to the upper end of the straight portion 17*a* is removed, the stylus member unwraps from the drum substantially the same as indicated in Fig. 6. This is for the reason that at relatively fast rates of rotation of the carrier the unwrapping of the stylus member from the carrier cannot occur very rapidly relative to the rate of rotation. Whether the upper portion of the curved part of the track is included or omitted, the stylus is wrapped up against the straight portion 17*a* of the track, by the magnetic attraction, substantially as indicated in Fig. 6.

The crooked tube 16*b* not only has the advantage of frictionally retaining the stylus wire 16*c* but makes it feasible to project the stylus wire onto the record sheet at a point laterally displaced with respect to the bar magnet 20 so that the latter does not obscure the recording made during the newest cycle of operation.

Although for the purpose of explaining the invention, a particular embodiment thereof has been shown and described, obvious modifications will occur to a person skilled in the art, and I do not desire to be limited to the exact details shown and described.

I claim:

1. Apparatus of the type described comprising: means for supporting and moving a record sheet in transversely flat shape through a record path past a scanning path extending transversely across said record path; a scanning mechanism positioned adjacent the front side of said record path and including a stylus carrier rotatable about a fixed axis and having a peripheral surface concentric with respect to said axis, and an elongated resilient stylus member attached at one end to said carrier and extending substantially tangentially from said peripheral surface of the carrier and having a free scanning end; means including a guide member positioned on the front side of said record path adjacent and parallel to said scanning path and in the plane of rotation of said stylus member and approximately tangent to said surface of the said carrier for contacting said stylus member during the scanning portion of each cycle of revolution thereof, and deflecting said scanning end into said scanning path; said stylus member and said guide member each comprising a ferromagnetic body extending the full length thereof, at least one of which is magnetized, whereby the entire portion of the stylus member from the carrier to said free scanning end is subject to magnetic attraction by said guide member.

2. Apparatus according to claim 1 in which said ferromagnetic body of said guide member comprises a bar magnet.

3. Apparatus according to claim 2 in which said bar magnet is transversely magnetized.

4. Apparatus acording to claim 3 in which said stylus member comprises a thin ribbon of approximately the same width as said bar magnet.

5. Apparatus according to claim 4 in which said bar magnet is offset toward said record path with respect to the stylus member.

6. Apparatus according to claim 5 in which said stylus member comprises, in addition to said steel strip, a crooked tube secured to the free end of said strip and a stylus wire extending through and frictionally retained within said tube, said wire constituting the record sheet contacting portion of the stylus member.

References Cited in the file of this patent

UNITED STATES PATENTS

| | | |
|---|---|---|
| 2,591,138 | Cooley | Apr. 1, 1952 |
| 2,614,903 | Stamper et al. | Oct. 21, 1952 |
| 2,643,174 | Cooley | June 23, 1953 |